United States Patent
Ikeda et al.

(10) Patent No.: US 7,646,175 B2
(45) Date of Patent: Jan. 12, 2010

(54) DEVICE AND METHOD FOR CONTROLLING A CURRENT SUPPLY

(75) Inventors: Junichi Ikeda, Kanagawa (JP); Shinya Manabe, Kanagawa (JP)

(73) Assignee: Ricoh Company, Ltd. (JP)

( * ) Notice: Subject to any disclaimer, the term of this patent is extended or adjusted under 35 U.S.C. 154(b) by 401 days.

(21) Appl. No.: 11/480,398

(22) Filed: Jul. 5, 2006

(65) Prior Publication Data

US 2007/0013345 A1 Jan. 18, 2007

(30) Foreign Application Priority Data

Jul. 5, 2005 (JP) ............... 2005-196330

(51) Int. Cl.
*H02J 7/04* (2006.01)
*H02J 7/16* (2006.01)
(52) U.S. Cl. ...................... 320/150; 320/155
(58) Field of Classification Search .......... 320/150, 320/152, 155, 157
See application file for complete search history.

(56) References Cited

U.S. PATENT DOCUMENTS

| | | | | |
|---|---|---|---|---|
| 5,497,068 A | * | 3/1996 | Shiojima | 320/150 |
| 5,739,672 A | * | 4/1998 | Lane | 320/139 |
| 2005/0194938 A1 | * | 9/2005 | Sanpei | 320/141 |

FOREIGN PATENT DOCUMENTS

| | | |
|---|---|---|
| JP | 11-103405 | 4/1999 |
| JP | 2003-163413 | 6/2003 |

* cited by examiner

*Primary Examiner*—Edward Tso
*Assistant Examiner*—Ramy Ramadan
(74) *Attorney, Agent, or Firm*—Dickstein Shapiro LLP

(57) ABSTRACT

A device or a method for supplying a current to a load. A peripheral temperature of the load is detected. Based on the detected peripheral temperature and a predetermined time period, the unit amount of the current being supplied is switched between a first current and a second current.

20 Claims, 2 Drawing Sheets

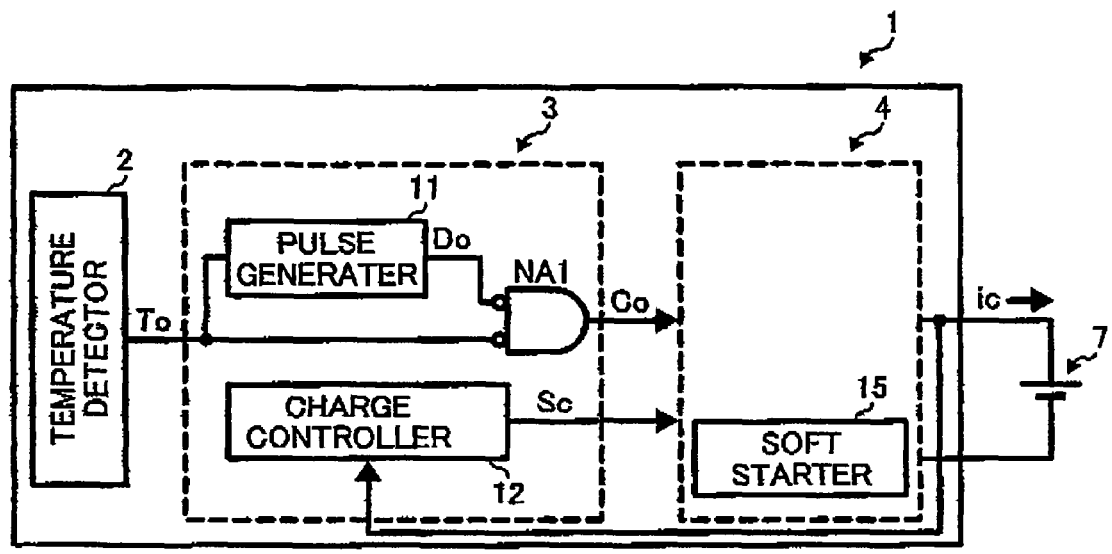
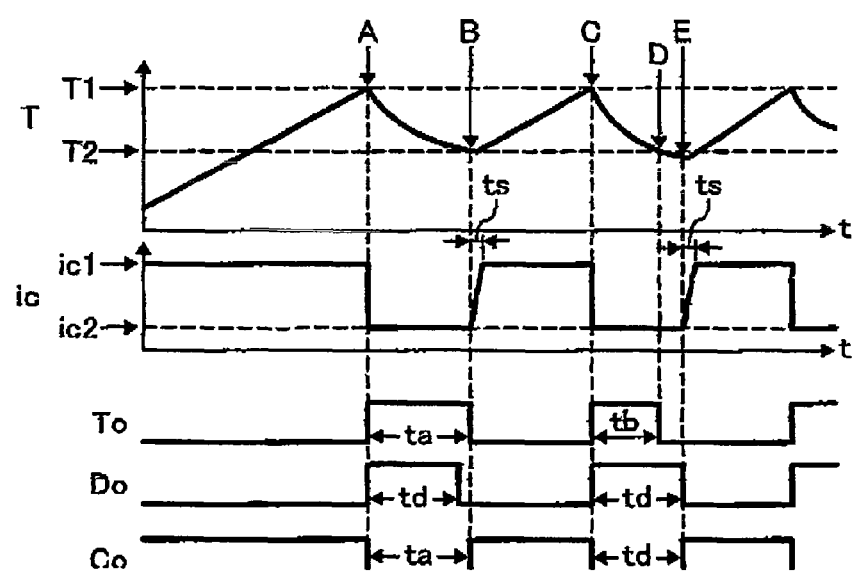

DEVICE AND METHOD FOR CONTROLLING A CURRENT SUPPLY

FIELD OF THE INVENTION

The following disclosure relates generally to a device and a method for controlling a current, which is used to charge a load.

DESCRIPTION OF THE RELATED ART

When charging a load, such as a battery or a cell, with a charging device, the temperature around the load or the charging device, i.e., the peripheral temperature, usually increases. To control the peripheral temperature, various devices or methods for controlling a current supply have been applied, for example, as described in Japanese Patent Application Publication No. H07-222370 or H11-103405.

In one example, a temperature detector, which monitors the peripheral temperature, may be provided with the charging device. When the peripheral temperature reaches above a first reference peripheral temperature, the charging device reduces the unit amount of current being supplied to the battery. While this may decrease the peripheral temperature, the charging time may become longer.

To reduce the charging time, the charging device may increase the unit amount of current when the peripheral temperature decreases and reaches below a second reference peripheral temperature, which is set lower than the first reference peripheral temperature. While this may reduce the charging time, the unit amount of current supply may frequently change, thus increasing the level of noise, such as the high frequency harmonic noise.

BRIEF SUMMARY OF THE INVENTION

Example embodiments of the present invention provide a device or a method for supplying a current to a load. In one example, a peripheral temperature of the load is detected. Based on the detected peripheral temperature and a predetermined time period, the unit amount of the current being supplied is switched between a first current and a second current.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a schematic diagram illustrating an example circuit configuration of a charging device according to an example embodiment of the present invention;

FIG. 2 is a timing chart illustrating an example operation performed by the charging device shown in FIG. 1;

DETAILED DESCRIPTION OF THE INVENTION

Figure 3:
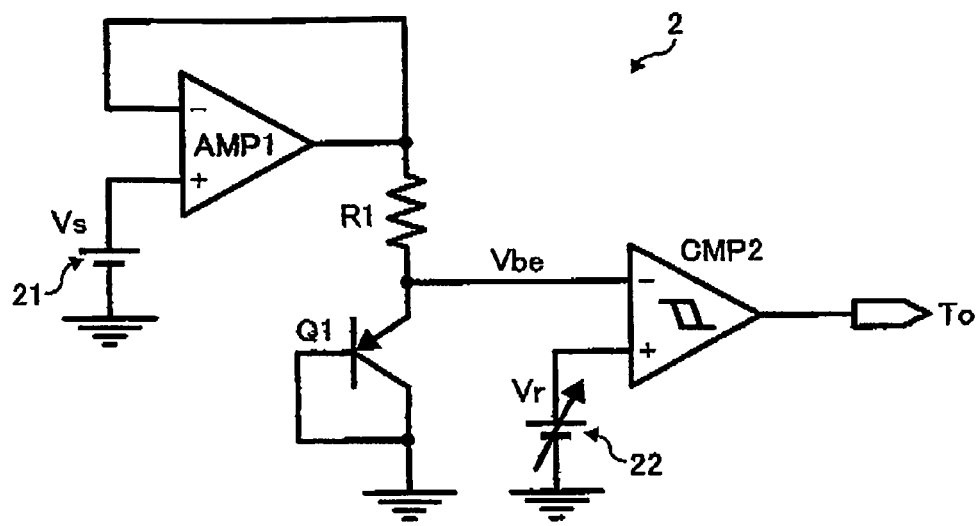
FIG. 3 is a schematic diagram illustrating an example circuit configuration of a temperature detector circuit shown in FIG. 1.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates a charging device 1 according to an example embodiment of the present invention.

Referring to FIG. 1, the charging device 1 supplies a current to a battery 7, which is connected to the charging device 1. In this example, the battery 7 is implemented by a secondary battery. The charging device 1 includes a temperature detector circuit 2, a controller circuit 3, and a current supply circuit 4.

The temperature detector circuit 2 detects a temperature of the charging device 1, and compares the detected temperature T with a first reference temperature T1 or a second reference temperature T2. In this example, the first reference temperature T1 is set higher than the second reference temperature T2. The difference between the first reference temperature T1 and the second reference temperature T2 may be set to be less than 5 degrees C., for example. When the detected temperature T is equal to or higher than the first reference temperature T1, the temperature detector circuit 2 outputs a detection signal To having the high value. When the detected temperature T is less than the second reference temperature T2, the temperature detector circuit 2 outputs a detection signal To having the low value.

The controller circuit 3 includes a pulse generator circuit 11, a NAND circuit NA1, and a charge controller circuit 12.

When the detection signal To having the high value is output from the temperature detector circuit 2, the pulse generator circuit 11 generates and outputs a pulse signal Do having the high value for a predetermined time period td. Thus, the pulse signal Do has the pulse width determined by the predetermined time period td. After the predetermined time period td passes, the pulse generator circuit 11 changes the value of the pulse signal Do from the high value to the low value.

The NAND circuit NA1 outputs a switch signal Co having the value determined by the values of the pulse signal Do and the detection signal To. When the values of the detection signal To and the pulse signal Do are both low, the NAND circuit NA1 outputs the switch signal Co having the high value. When the value of at least one of the detection signal To and the pulse signal Do is high, the NAND circuit NA1 outputs the switch signal Co having the low value.

The charge controller circuit 12 detects a voltage applied to the battery 7, and compares the detected voltage with a reference voltage to output a control signal Sc. When the detected voltage is lower than the reference voltage, the charge controller circuit 12 outputs the control signal Sc having a first value, which causes the current supply circuit 4 to charge the battery 7 with a controlled current. When the detected voltage exceeds the reference voltage, the charge controller circuit 12 outputs the control signal Sc having a second value, which causes the current supply circuit 4 to charge the battery 7 with a controlled voltage.

The current supply circuit 4 supplies a current ic to the battery 7. In this example, when the control signal Sc having the first value is output, the current supply circuit 4 outputs the current ic having a value determined by the value of the switch signal Co. When the switch signal Co having the high value is output, the current supply circuit 4 outputs a first current ic1. When the switch signal Co having the low level is output, the current supply circuit 4 outputs a second current ic2, which has the value smaller than the value of the first current ic1. For example, the value of the second current c2 may be set to about 10% of the value of the first current ic1. Further, in this example, when the control signal Sc having the second value is output, the value of the current is not changed.

Still referring to FIG. 1, the current supply circuit 4 includes a soft starter circuit 15, which causes the current supply circuit 4 to gradually switch the current between the first current ic1 and the second current ic2.

Referring to FIG. 2, an example operation of the charging device 1 is explained. In this example, the charging device 1 is integrated in a single intergraded circuit chip together with the battery 7 and a transistor device. The temperature of the chip is used as the detected temperature T.

As the charging device 1 supplies a current to the battery 7, the temperature of the chip, i.e., the detected temperature T, increases. When the detected temperature T reaches the first reference temperature T1 at a timing A, the detection signal To output from the temperature detector circuit 2 is switched from the low value to the high value. At the timing A, the pulse generator circuit 11 outputs the high-value pulse signal Do, which has the pulse width of td. Since the values of the pulse signal Do and the detection signal To become high at the timing A, the switch signal Co output from the NAND circuit NA1 is switched from the high value to the low value.

When the switch signal Co having the low value is output, the current supply circuit 4 supplies the second current ic2 to the battery 7. Since the second current ic2 is smaller than the first current ic1, the detected temperature T of the chip gradually decreases after the timing A. When the detected temperature T of the chip reaches below the second reference temperature T2 at a timing B, the temperature detector circuit 2 changes the detection signal To from the high value to the low value. In this example, a time period between the timing A and the timing B is greater than the time period td.

When the values of the pulse signal Do and the detection signal To become low at the timing B, the switch signal Co output from the NAND circuit NA1 is switched from the low value to the high value. The current supply circuit 4 supplies the first current ic1 to the battery 7. In this example, the soft starter circuit 15 starts operating when the current is switched from the second current ic2 to the first current ic1. As shown in FIG. 2, with the soft starter circuit 15, the current value gradually increases such that it takes a time period ts to completely switch from the second current ic2 to the first current ic1. In this manner, generation of high harmonic noise may be suppressed.

As the first current ic1 is supplied, the detected temperature T of the chip starts increasing again. When the detected temperature T reaches the first reference temperature T1 at a timing C, the detection signal To is switched from the high value to the low value. The pulse signal Do is switched from the high value to the low value. The switch signal Co is switched from the high value to the low value.

When the detected temperature T of the chip further decreases and reaches below the second reference temperature T2 at a timing D, the detection signal To is switched from the high value to the low value. At the timing D, the pulse signal Do is not switched from the high value to the low value, since the time period td is not passed. As shown in FIG. 2, the time period between the timing C and the timing D is less than the time period td. Since the switch signal Co retains the low value, the current supply circuit 4 continues to supply the second current c2 to the battery 7. When the timing period td passes at a timing E, the pulse signal Do is switched from the high value to the low value as the values of the detection signal To and the pulse signal Do become low at the timing E. Accordingly, the current is gradually switched from the second current ic2 to the first current ic1. As described above referring to FIG. 1 or 2, the control circuit 3 prevents the current supply circuit 4 from switching the current for the predetermined time period td after the current has been changed. In this manner, generation of high frequency noise may be suppressed.

Referring to FIG. 3, an example circuit configuration of the temperature detector circuit 2 is explained. The temperature detector circuit 2 includes an operational amplifier AMP1, a comparator CMP2, a supply voltage generator circuit 21, a reference voltage generator circuit 22, a PNP transistor Q1, and a resistor R1.

Figure 4:
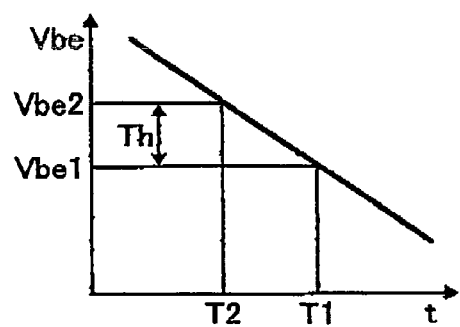
FIG. 4 is a graph illustrating the relationship between a detected peripheral temperature and a base-to-emitter voltage, obtainable from the temperature detector circuit shown in FIG. 1.

The operational amplifier AMP1 has a non-inverse input terminal connected to the supply voltage generator circuit 21, and an inverse input terminal connected to its output terminal. The output terminal of the operational amplifier AMP1 receives a supply voltage Vs, which is generated by the supply voltage generator 21. The output terminal of the operational amplifier AMP1 is further connected to an emitter of the PNP transistor Q1 via the resistor R1. The PNP transistor Q has a base and a collector, each of which is connected to the ground. The operational amplifier AMP1 supplies a current to the PNP transistor Q1 via the resistor R1. The base-to-emitter voltage of the PNP transistor Q1, i.e., the base-to-emitter voltage Vbe, increases or decreases proportionally relative to the detected temperature T of the chip. For example, as shown in FIG. 4, as the detected temperature T increases, the base-to-emitter voltage Vbe decreases.

The comparator CMP2 has a non-inverse input terminal connected to the reference voltage generator Vr, and an inverse input terminal connected to the emitter of the PNP transistor Q1. The comparator CMP2 compares the base-to-emitter voltage Vbe with a reference voltage Vr generated by the reference voltage generator Vr, and outputs the detection signal To.

Figure 5:
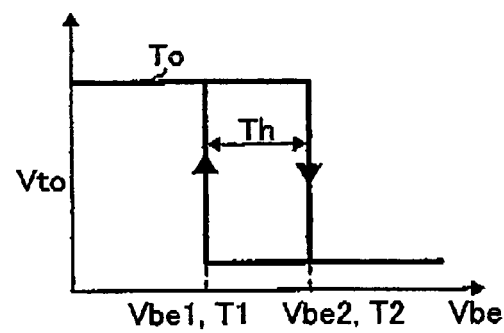
FIG. 5 is a graph illustrating the relationship among a detected peripheral temperature, a base-to-emitter voltage, a detection signal value, and a detection signal voltage, obtainable from the temperature detector circuit shown in FIG. 1.

In this example, the comparator CMP2 may be implemented so as to have hysteresis characteristics, which may be observed when using a Schmitt trigger. In this example, as shown in FIG. 4 or 5, the hysteresis width of the comparator CMP2 is set to be substantially equal to the difference between a first reference voltage Vbe1 and a second reference voltage Vbe2. The first reference voltage Vbe1 is the voltage Vbe obtained when the detected temperature T reaches the first reference temperature T1. The second reference voltage Vbe2 is the voltage Vbe obtained when the detected temperature T reaches the second reference temperature T2.

For example, when the detected voltage Vbe is below the first reference voltage Vbe1, the comparator CMP2 outputs the detection signal To having the low value. When the detected voltage Vbe is above the second reference voltage Vbe2, the comparator CMP2 outputs the detection signal To having the high value. When the detected voltage Vbe is between the first reference voltage Vbe1 and the second reference voltage Vbe2, the value of the detection signal To is not changed. In this manner, the function of the temperature detector circuit 2 may be performed with the relatively simple structure.

Referring to FIG. 5, when the temperature T of the chip increases and reaches the second reference temperature T2, the detection signal To or the voltage Vto of the detection signal To retains the low value. When the temperature T continues to increase and reaches the first reference temperature T1, the detection signal To or the voltage Vto of the detection signal To is switched from the low value to the high value.

When the temperature T of the chip decreases and reaches the first reference temperature T1, the detection signal To or the voltage Vto of the detection signal To retains the high value. When the temperature T continues to decrease and reaches the second reference temperature T2, the detection signal To or the voltage Vto of the detection signal is switched from the high value to the low value.

Numerous additional modifications and variations are possible in light of the above teachings. It is therefore to be understood that within the scope of the appended claims, the disclosure of this patent specifications may be practiced in ways other than those specifically described herein.

For example, elements and/or features of different illustrative embodiments may be combined with each other and/or substituted for each other within the scope of this disclosure and appended claims.

In another example, the charging device 1 may be implemented in various other ways. For example, the NAND circuit NA1 may be substituted by an AND circuit and an inverter circuit, or any other kind of switching circuit. The pulse generator 11 may be substituted by any other kind of timing circuit capable of counting the time period td. The soft starter circuit 15 may not be provided in the charging device 1. The soft starter circuit 15 may cause the current supply circuit 4 to gradually decrease the current from the first current ic1 to the second current ic2.

Further, a charging device, such as the charging device of FIG. 1, may be integrated into a single integrated circuit chip together with a battery and/or any kind of circuit, including, for example, a drive circuit. The chip may be incorporated into any kind of apparatus, such as an image forming apparatus, a communication apparatus, automobile, information processing apparatus, image processing apparatus, etc.

This patent application is based on and claims priority to Japanese patent application No. 2005-196330 filed on Jul. 5, 2005, in the Japanese Patent Office, the entire contents of which are hereby incorporated by reference.

The invention claimed is:

1. A device for supplying a current to a load, the device comprising:
   a temperature detector circuit configured to detect a peripheral temperature of the load and output a detection signal having a high or low value determined by a relation of the peripheral temperature to first and second reference peripheral temperatures, the first reference peripheral temperature being higher than the second reference peripheral temperature;
   a timing generator circuit connected to the temperature detector circuit and configured to generate a timing signal having a value periodically switched between a high and low value, the timing signal being held at one of the values for a predetermined time when the detection signal indicates the peripheral temperature of the load is higher than the first reference peripheral temperature;
   a switching circuit comprising inverted AND logic and receiving as inputs the detection and timing signals output by the temperature detector circuit and timing generator circuit, respectively, configured to generate a switch signal having a high or low value determined by the values of the timing signal and the detection signal; and
   a current supply circuit connected to the switching circuit and configured to supply a high or low value current to the load depending on the value of the switch signal, the low value current being a current value that, when supplied to the load, causes the peripheral temperature of the load to decrease, wherein the switching circuit is operable to cause the current supply circuit to supply the high value current to the load until the detection signal indicates the peripheral temperature of the load is higher than the first reference peripheral temperature; and supply the low value current to the load until both the timing signal indicates the predetermined time has elapsed and the detection signal indicates the peripheral temperature of the load is lower than the second reference peripheral temperature.

2. The device of claim 1, wherein the value of the detection signal is set to high when the peripheral temperature is above the first reference peripheral temperature, and the value of the detection signal is set to low when the peripheral temperature is below the second reference peripheral temperature.

3. The device of claim 2, wherein the value of the timing signal is set to high for a predetermined time period starting from the timing when the value of the detection signal is switched from the high value to the low value.

4. The device of claim 3, wherein the value of the switch signal is set to high when the detection signal has the low value and the timing signal has the low value, and the value of the switch signal is set for low when at least one of the detection signal and the timing signal has the high value.

5. The device of claim 4, wherein the value of the current is set to high when the switch signal has the high value, and the value of the current is set to low when the switch signal has the low value.

6. The device of claim 1, further comprising:
   a charge controller circuit configured to detect a voltage of the load and to compare the detected voltage with a reference voltage to output a control signal,
   wherein the current supply circuit supplies the current having the value determined by the value of the switch signal when the control signal having a first value is output.

7. The device of claim 1, wherein the current supply circuit comprises:
   a soft starter circuit configured to cause the current supply circuit to gradually increase the current when the value of the current is switched from the low value to the high value.

8. The device of claim 7, wherein the soft starter circuit is further configured to cause the current supply to gradually decrease the current when the value of the current is switched from the high value to the low value.

9. The device of claim 2, wherein the temperature detecting circuit comprises:
   a temperature-voltage converting circuit configured to convert the peripheral temperature of the load to a detected voltage;
   a reference voltage generator circuit configured to output a reference voltage having a first value or a second value; and
   a comparator circuit connected to the temperature-voltage converting circuit and the reference voltage generator circuit and configured to compare the detected voltage with the reference voltage to generate a comparison result,
   wherein the detection signal has the low value when the comparison result indicates that the detected voltage has a value below the first value of the reference voltage, and the detection signal has the high value when the comparison result indicates that the detected voltage has a value above the second value of the reference voltage, the difference between the first value and the second value of the reference voltage being determined by the difference between the first reference peripheral temperature and the second reference peripheral temperature.

10. The device of claim 1, wherein the temperature detecting circuit comprises a comparator circuit having hysteresis characteristics.

11. The device of claim 1, wherein the peripheral temperature of the load corresponds to a temperature of an integrated circuit chip.

12. The device of claim 10, wherein the integrated chip comprises the load and a transistor.

13. An apparatus, comprising;
a load; and
a device connected to the load and configured to supply a current to the load, the device comprising:
  a temperature detector circuit configured to detect a peripheral temperature of the load and output a detection signal having a high or low value determined by a relation of the peripheral temperature to first and second reference peripheral temperatures, the first reference peripheral temperature being higher than the second reference peripheral temperature;
  a timing generator circuit connected to the temperature detector circuit and configured to generate a timing signal having a value periodically switched between a high and low value, the timing signal being held at one of the values for a predetermined time when the detection signal indicates the peripheral temperature of the load is higher than the first reference peripheral temperature;
  a switching circuit comprising inverted AND logic and receiving as inputs the detection and timing signals output by the temperature detector circuit and timing generator circuit, respectively, configured to generate a switch signal having a high or low value determined by the values of the timing signal and the detection signal; and
  a current supply circuit connected to the switching circuit and configured to supply a high or low value current to the load depending on the value of the switch signal, the low value current being a current value that, when supplied to the load, causes the peripheral temperature of the load to decrease, wherein the switching circuit is operable to cause the current supply circuit to supply the high value current to the load until the detection signal indicates the peripheral temperature of the load is higher than the first reference peripheral temperature; and supply the low value current to the load until both the timing signal indicates the predetermined time has elapsed and the detection signal indicates the peripheral temperature of the load is lower than the second reference peripheral temperature, and wherein the load and the device are integrated in a single integrated circuit chip.

14. A charging device, comprising:
means for supplying a current to a load in response to a switch signal, the current having a first value or a second value, said second value being a current value that, when supplied to the load, causes a peripheral temperature of the load to decrease;
means for detecting the peripheral temperature of the load;
means for generating a timing signal, the timing signal being held at a given value for a predetermined time when the peripheral temperature detection means indicates the peripheral temperature of the load is higher than a first reference peripheral temperature; and
means for controlling the supplying means by switching the current between the first value and the second value, said controlling means comprising a NAND circuit receiving as inputs outputs of the peripheral temperature detection means and the timing signal generation means;
wherein when the current supplied to the load is switched from the first value to the second value, the controlling means holds the current supplied to the load at the second value until both the predetermined time period has passed and the peripheral temperature is below the first reference peripheral temperature.

15. The device of claim 14, wherein the controlling means causes the supplying means to switch the current supplied to the load from the first value to the second value when the peripheral temperature is above a second reference peripheral temperature higher than the first reference peripheral temperature.

16. The device of claim 14, wherein the controlling means comprises:
means for causing the current to gradually changing the value of the current between the first value and the second value.

17. The device of claim 16, wherein the detecting means comprises:
means for converting the peripheral temperature of the load to a detected voltage;
means for comparing the detected voltage with a first reference voltage value or a second reference voltage value to generate a comparison result; and
means for generating a detected signal having a high value or a low value based on the comparison result,
wherein the detected signal has the low value when the comparison result indicates that the detected voltage has a value below the first reference voltage value, and the detected signal has the high value when the comparison result indicates that the detected voltage has a value above the second reference voltage value.

18. A method for switching a current being supplied to a load, the method comprising;
at a temperature detector, outputting a first detection signal when a peripheral temperature of the load is above a first preference peripheral temperature;
at a timing generator connected to the temperature detector, counting a time period starting from receipt of the first detection signal from the temperature detector circuit to generate a counted time period;
at inverted AND logic connected to the temperature detector and the timing generator, outputting a first switch signal upon receipt of the first detection signal from the temperature detector circuit to switch the current from a first current to a second current that, when supplied to the load, results in a decrease in the peripheral temperature of the load;
at the temperature detector, outputting a second detection signal when a peripheral temperature of the load falls below the first preference peripheral temperature; and
at the inverted AND logic, outputting a second switch signal when both the counted time period is equal to or greater than a predetermined time period and the second detection signal is received from the temperature detector to cause the current to switch from the second current to the first current.

19. The device of claim 1, wherein the inverted AND logic comprises a NAND gate.

20. The device of claim 1, wherein the inverted AND logic comprises an AND gate and an inverter.

* * * * *

UNITED STATES PATENT AND TRADEMARK OFFICE
CERTIFICATE OF CORRECTION

PATENT NO.       : 7,646,175 B2
APPLICATION NO.  : 11/480398
DATED            : January 12, 2010
INVENTOR(S)      : Ikeda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 446 days.

Signed and Sealed this

Sixteenth Day of November, 2010

David J. Kappos
*Director of the United States Patent and Trademark Office*